April 25, 1961 W. P. GOODE ET AL 2,981,503
AILERON CONTROLLED SPOILER OPERATING MECHANISM
Filed Sept. 30, 1959 3 Sheets-Sheet 3
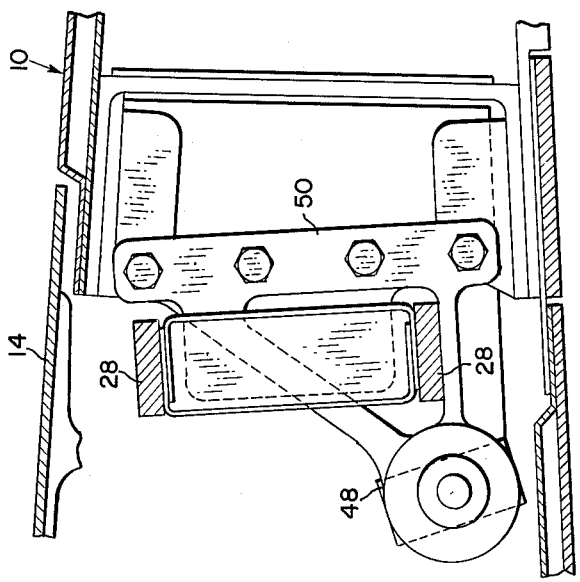
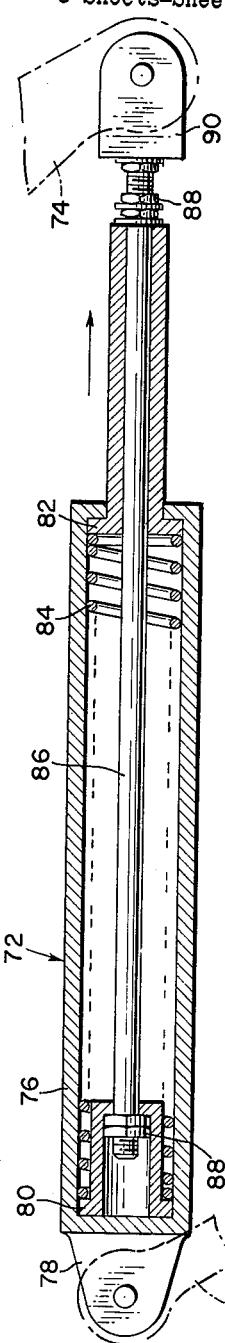
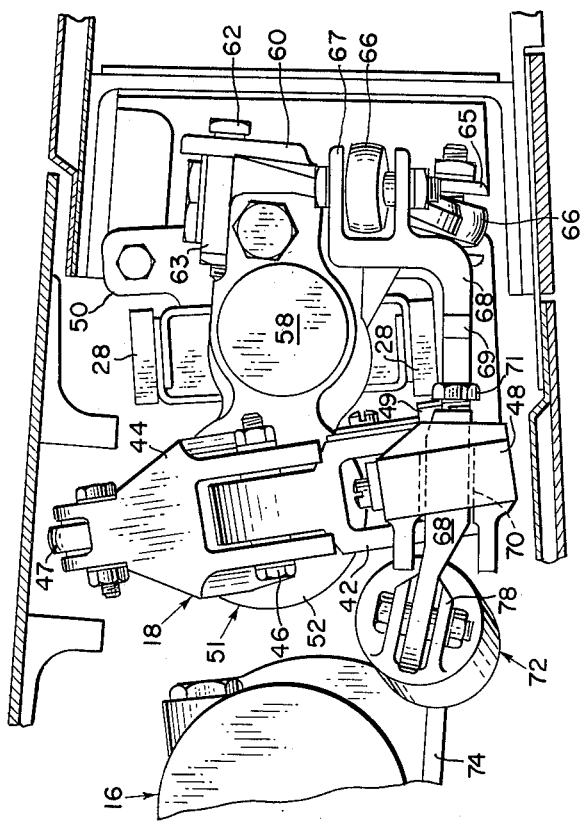
INVENTORS
WILLIAM P. GOODE
RICHARD M. JOHNSON
BY
ATTORNEYS

United States Patent Office 2,981,503
Patented Apr. 25, 1961

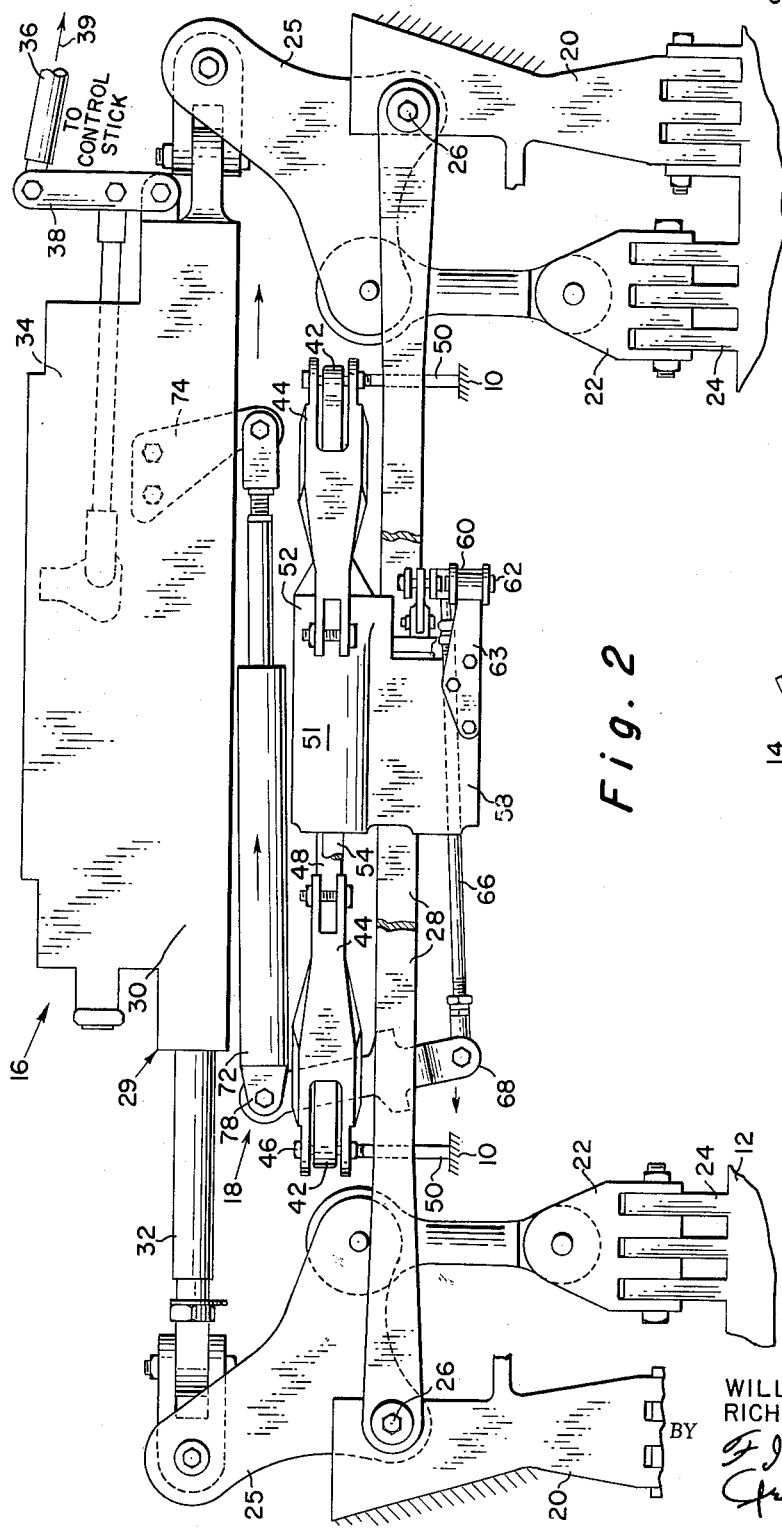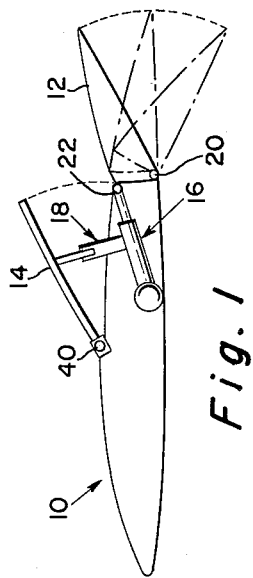
INVENTORS
WILLIAM P. GOODE
RICHARD M. JOHNSON

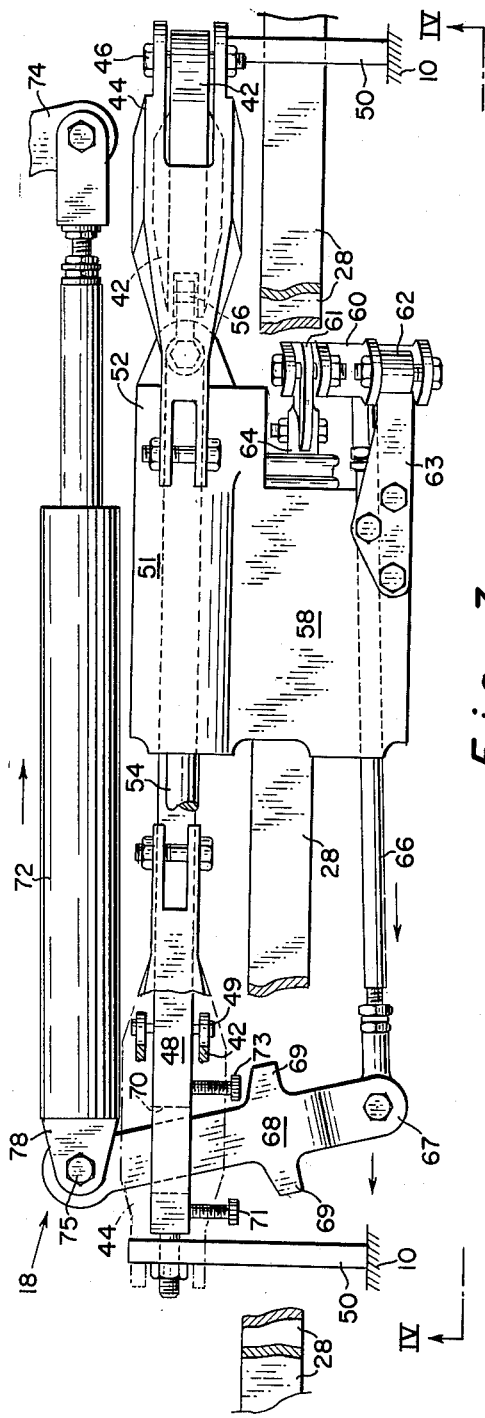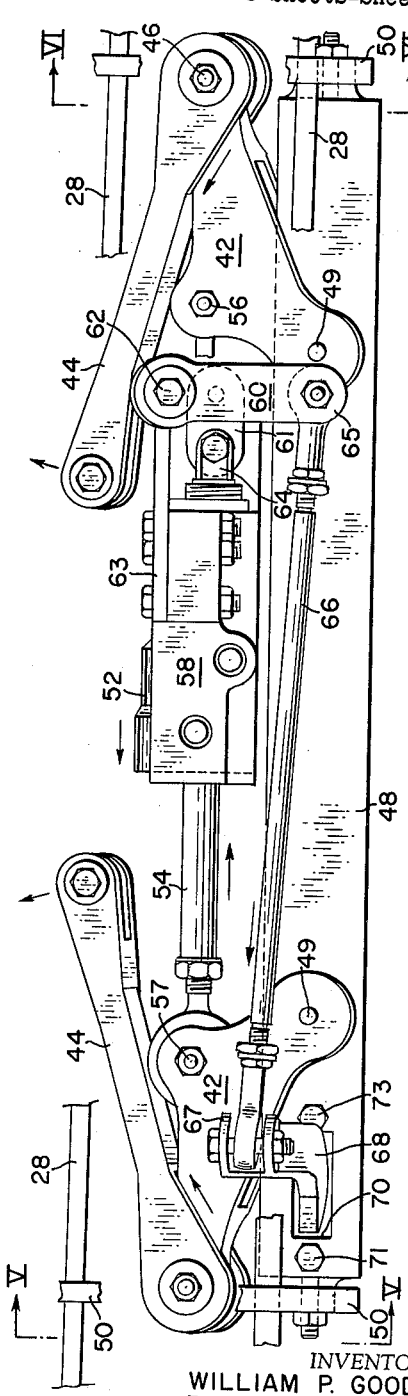

2,981,503

AILERON CONTROLLED SPOILER OPERATING MECHANISM

William P. Goode and Richard M. Johnson, Dallas, Tex., assignors, by mesne assignments, to the United States of America as represented by the Secretary of the Navy Filed Sept. 30, 1959, Ser. No. 843,609

6 Claims. (Cl. 244—90)

This invention relates to combined spoiler-aileron controls for aircraft, and more particularly to a spoiler power control slaved directly to the aileron power controls under certain conditions of aileron movement.

The use of spoilers to disturb the airflow over wing structures and reduce the lift, and to increase roll rate is an expedient well known in the art. For the most part these mechanisms were combined with the aileron controls by various complicated and bulky articulated arrangements manually actuated and controlled by the pilot. Recent advances in aircraft speeds and thinner wings necessitate stronger structures and full power aileron controls that occupy a smaller area. Spoiler controls have a corresponding requirement as do the controls for ailerons.

One suitable full-power aileron control which has been designed to meet the requirements of present-day aircraft is described in U.S. patent application Serial No. 735,077 filed by J. B. Murray and W. D. Yarnall. The spoiler control mechanism of this invention is particularly suitable for incorporation in the aileron controls of the aforementioned patent application, but not limited to such use.

The spoiler mechanism consists of a closed power loop with its related follow-up linkage. A spoiler motor comprising a cylinder and associated piston is freely supported between and pivotally connected at opposite respective ends to a pair of spaced bell cranks. One end of each bell crank is pivoted to the wing structure and another end of each bell crank is connected to the spoiler through a spoiler link. Operation of the spoiler motor to actuate the spoiler surface is controlled by a spoiler valve through a walking beam which in turn is actuated by an elastic strut fixedly connected to the movable aileron mechanism i.e. aileron cylinder. The elastic strut is spring biased to a fixed length to enable the spoiler mechanism to be actuated only when the aileron is raised above a neutral position, while permitting the aileron mechanism to move independently the spoiler mechanism when the latter is inactive. The amount the spoiler is positioned above neutral is proportional to the amount the aileron is positioned above neutral. When the aileron is between approximately 2° above neutral and 45° below neutral, the spoiler is inactive being flush with the wing contour.

A principal object is to provide a power-operated spoiler mechanism that is slaved to a power-operated aileron mechanism through a predetermined zone of aileron movement, and a corollary object is to achieve such control through an elastic link.

Another object is to provide a power-operated spoiler mechanism wherein the spoiler is actuated by a hydraulic motor freely suspended within limits between a pair of bell cranks.

Other objects and many of the attendant advantages of this invention will be readily appreciated as the same becomes better understood by reference to the following detailed description when considered in connection with the accompanying drawings wherein:

Fig. 1 is a diagrammatic side view of an aircraft wing showing the spoiler and aileron surfaces slaved in an elevated position;

Fig. 2 is a top plan view of a central wing portion showing one type of aileron mechanism in which the spoiler mechanism of this invention can be employed, the latter being shown in general arrangement;

Fig. 3 is an enlarged detailed top plan view of the spoiler mechanism;

Fig. 4 is an aft elevation view of the spoiler mechanism taken along line IV—IV of Fig. 3;

Figs. 5 and 6 are end views of the spoiler mechanism taken along lines V—V and VI—VI respectively, of Fig. 4; and Fig. 7 is a longitudinal section of an elastic strut.

Referring to the drawing where like reference numerals refer to similar parts throughout the drawing there is shown in Fig. 1 a mid-portion of an aircraft wing 10 provided with an aileron control surface 12 and an associated spoiler control surface 14. An identical control surface arrangement is provided for each aircraft wing structure, and the following description is limited to one wing but will apply equally to both wings.

Aileron 12 is power-operated by a mechanism 16, one suitable mechanism being shown in Fig. 2, and is described in a U.S. patent application Serial No. 735,077, filed by J. B. Murray and W. D. Yarnall.

Although the details are not a part of this invention, aileron operating mechanism 16 will be described briefly with reference to Fig. 2 as background for a novel spoiler operating mechanism 18 presently to be described. Aileron 12 is hingedly supported to wing 10 by a pair of horizontally disposed hinge fittings 20. Pivotal displacement of the aileron is effected through a pair of trunnions 22 disposed inwardly the hinge fittings and pinned to aileron horns 24. Trunnions 22 are pivoted to a pair of aileron bell cranks 25, arranged in mirror image, and fulcrumed at 26 to the wing structure. A pair of upper and lower straps 28 extend between and are anchored to pivots 26. Other ends of the bell cranks are pivotally connected to and support respective ends of an aileron motor 29 including an aileron cylinder 30 and piston 32, whereby expansion and contraction of aileron motor 29 in response to pilot-input will rotate the bell cranks the same amount in opposite directions to raise or lower the aileron, respectively. The porting of hydraulic fluid to the respective ends of cylinder 30 is controlled by a slider valve 34 integral with the cylinder and actuated by pilot input linkage 36 through an idler link 38 pivotally mounted on the cylinder.

An "up-aileron" movement in linkage 36, indicated by arrow 39 to the right, causes aileron motor 29 to expand, cylinder 30 moving to the right and rotating the corresponding bell crank clockwise. Piston 32 rod moves to the left an equal amount, rotating its bell crank in an opposite counter clockwise direction, both bell cranks raising the aileron above the neutral position (Fig. 1). Aileron motor 29 will continue to expand until idler link 38 is restored to the vertical neutral position which completes a follow-up action, and the controls remain in this laterally displaced position until the next pilot input. A "down-aileron" movement will cause aileron motor 29 to contract and the associated parts will move in a reverse direction of the arrows.

Spoiler surface mechanism 18 (Figs. 3 and 4), which forms the subject of the instant invention, is nested within the above described aileron mechanism (see Fig. 2) and is operative thereby only by a movement of the aileron in a predetermined sector above its neutral position. Spoiler 14 is longitudinally hinged at 40 to a beam in the upper portion of wing 10, the spoiler being actuated from within the wing cavity by a pair of spaced spoiler bell cranks 42 and a pair of pivotal links 44. Each link is pivotally connected at 46 to the bell crank and pivoted at the other end to the spoiler by a rotatable pin 47 (Fig. 5). Bell cranks 42 are pivotally anchored at opposite ends 49 to a common spoiler feedback bar 48 rotatably supported by end brackets 50 secured to wing structure 10 and to aileron straps 28 (Fig. 6). Bar 48 is rockably supported by suitable bearings in brackets 50 to enable the angle between the spoiler bell cranks 42 and spoiler 14 to vary as the latter is raised and lowered. Thus, feedback bar 48 rotatably supports the spoiler motor and associated linkage. Bell cranks 42 are disposed in mirror image, similar to, but smaller than, aileron bell cranks 25 and operative in a plane approximately 90° removed.

Spoiler bell cranks 42 are actuated by and freely support therebetween a hydraulic spoiler motor 51 including a cylinder 52 and an associated piston 54; a right end of the cylinder being pivotally connected at 56 (Fig. 4) to an intermediate point on the corresponding bell crank, and a left end of the piston being pivotally connected to a corresponding point 57 on its bell crank. Expansion and contraction of spoiler motor 51 will cause a corresponding lowering and raising, respectively, of the spoiler in an amount proportional to the aileron position above neutral, through a scissor action between the respective spoiler links 44 and bell cranks 42.

Operation of the spoiler by pressurized hydraulic fluid from a suitable source (not shown) is controlled by a spoiler slider valve 58 mounted integrally with the spoiler cylinder 52. Valve 58 is actuated by an idler arm 60 pivoted at upper end 62 on a bracket 63 bolted to the valve housing; arm 60 also being intermediately connected by a link 61 to a spoiler valve stem 64 and connected at the lower end by a clevis joint 65 to one end of a push rod 66 (Fig. 5). Clevis 65 provides sufficient clearance to permit a slight pivot movement of the spoiler cylinder and valve relative to push rod 66. Push rod 66 extends parallel to straps 28 and at the left end is pivotally connected to a clevis end 67 of an L-shaped walking beam 68 extending substantially normal thereto and projecting through and pivoted within a slot 70 in feedback bar 48. The pivotal movement of walking beam 68 is limited by a pair of adjustable stops 71, 73 mounted on feedback bar 48. Walking beam 68 has a pair of shoulders 69, one of which engages stop 71 when the spoiler surface is "full-up" (i.e. 49°), and the other shoulder engages stop 73 when the spoiler is in "neutral." Adjustment of the stops may be made so that the spoiler is in "neutral" when the aileron is in 2° "up" position to provide for trim movements and setting of the aileron without any raising of the spoiler.

The forward projecting end of beam 68 is pivoted at 75 to one end of a so-called "funk spring" or an elastic strut 72, the other end of the strut being fixedly attached by a lug 74 to the aileron cylinder 30. Elastic strut 72 serves an important function in the slaving of spoiler control mechanism 18 to aileron control mechanism 16, in that strut 72 either transmits (fixed length) the motion of the aileron mechanism, or absorbs (varying length) the aileron movement without affecting spoiler movement.

The details of elastic strut 72 are shown in Fig. 7 and comprise a cylinder or housing 76 pivoted to walking beam 68 by an integral lug 78 at one end. Slidably disposed in housing 76 are a pair of oppositely disposed collars 80 and 82 normally biased apart against the ends of the housing by a coil compression spring 84 positioned therebetween giving the strut a fixed length. A rod 86 extends freely through and restrains the collars against the spring action by stop nuts 88, each collar being movable on the rod in one direction to further compress spring 84. A projecting end of rod 86 is provided with a threadedly adjustable lug 90 for pivotal attachment to aileron cylinder lug 74. In normal operation, the coil spring maintains the collars in an outermost position in the housing (as determined by stop nuts 88) providing a strut of fixed length as any conventional control rod. However, when the load on the elastic strut exceeds a breakout force (i.e. 100 pounds), the spring will be further compressed to lengthen or shorten the strut length, depending on the direction of the force. Thus, strut 72 may be defined as an elastic strut between the aileron and spoiler mechanisms.

The operation of spoiler mechanism 18 is as follows, with particular reference to Fig. 2 where the aileron and spoiler surfaces are assumed to be in a "neutral" position. Assuming a given "up-aileron" pilot input in linkage 36, aileron cylinder 30 moves to the right in the direction of the arrows as previously described. In the following description all motion arrows in the various figures indicate a corresponding motion of a component caused by an "up-aileron" pilot input. Elastic strut 72 acting as a fixed length member moves to the right by lug 74 causing walking beam 68 to pivot clockwise about feedback bar 48 and freely between stops 71, 73 (Fig. 3), actuating push rod 66, idler arm 60 and slider valve 58, to the left. Valve 58 admits pressurized hydraulic fluid to contract spoiler motor 51, causing spoiler cylinder 52 and piston 54 and the respective spoiler bell cranks 42 to move toward each other, and forcing links 44 and the attached spoiler 14 upwardly into the airstream (Fig. 1). As spoiler bell cranks 42 and links are spread apart in a scissor-like action (Fig. 4) by the spoiler cylinder to raise the spoiler, the entire assembly rotates slightly with feedback bar 48 about brackets 50 to permit the pivotal action of the spoiler.

As spoiler cylinder 52 moves to the left, as described above, idler arm pivot point 62, being fixed to the cylinder, is moved in the same direction to restore idler arm 60 to a new vertical position (laterally offset from the previous position) neutralizing slider valve 58 and complete the closed loop follow-up action until the next pilot input. The linkage of the spoiler mechanism can be adjustably connected that while the aileron is moving from the 2° "neutral" position to the 15° "full-up" position, the spoiler moves from "neutral" to the 49° "full-up" position.

When the spoiler reaches the "full-up" position, walking beam 68 engages stop 71 to limit further clockwise rotation of beam 68 and, consequently, any movement to the left of strut housing 76. As a result, any further "up-aileron" movement of aileron cylinder 30 now forces strut 72 to become elastic, and collar 80 compresses spring 84 to absorb the over-travel of the aileron cylinder.

If the pilot input is reversed to a "down-aileron" movement (not illustrated), the aileron motor contracts, in a direction opposite to the arrows, and elastic strut 72, and the depending components also move in the opposite direction to that described above for the "up-aileron" movement. Movement of strut 72 to the left rotates walking beam 68 counterclockwise. When spoiler surface 14 is in a "neutral" position (2° up) walking beam 68 engages stop 73. Thereafter, any overtravel by a further "down-aileron" pilot input is absorbed by elastic strut 72 through the compression of springs 84 by collar 82. The spoiler mechanism remains inactive until the aileron is moved into the zone above neutral position.

Thus, it can be seen that elastic strut 72 acts as a fixed length link to slave the spoiler mechanism to the aileron mechanism when the aileron moves in a predetermined zone above neutral (i.e. between up 2° to up 14°); and the strut 72 acts as an elastic link when the aileron is moved above up 14°, or below "neutral" position.

The novel spoiler mechanism of this invention provides a hydraulic motor which is pivotally supported between bell cranks and movable therebetween to actuate the spoiler surface through a closed loop, follow-up system. The motor is slaved to the movement of an aileron mechanism through an elastic strut to enable the spoiler mechanism to be operated through only a desired portion of the aileron movement and be inactive during another portion of aileron movement without affecting operation of the latter. The spoiler mechanism forms a compact assembly within the aileron mechanism.

Obviously many modifications and variations of the present invention are possible in the light of the above teachings. It is therefore to be understood that within the scope of the appended claims the invention may be practiced otherwise than as specifically described.

We claim:

1. In an aircraft wing having an aileron, a mechanism for actuating said aileron proportional to pilot input; and a spoiler, operating mechanism for said spoiler comprising a reversible motor for raising and lowering the spoiler, means for controlling the direction of motor operation, linkage connecting the motor to the spoiler, and variable length mechanical means connecting the motor control means to the aileron actuating mechanism, said variable length means having a fixed length to position the spoiler proportional to aileron position for a predetermined zone of aileron movement and being variable in length to absorb aileron movement when the aileron is outside said predetermined zone.

2. In an aircraft wing having an aileron, a mechanism for actuating said aileron proportional to pilot input, and a spoiler, operating mechanism for said spoiler comprising a reversible motor for raising and lowering the spoiler, means for controlling the direction of motor operation, linkage connecting the motor to the spoiler, and an elastic strut connecting the motor control means to the aileron actuating mechanism, said strut being rigid to transmit aileron movement to control the positioning of the spoiler proportional to the aileron position for a predetermined zone of aileron movement, and said strut being elastic to absorb the movement of the aileron actuating mechanism when the aileron is outside the predetermined zone.

3. In an aircraft wing having an aileron, a hydraulic mechanism for actuating said aileron proportional to pilot input, and a spoiler; operating mechanism for said spoiler comprising a reversible hydraulic motor for raising and lowering the spoiler, valve means for controlling the direction of motor operation, linkage connecting the motor to the spoiler, means connecting the valve means to the aileron actuating mechanism said connecting means including an elastic strut, means for limiting the movement of the elastic strut, said elastic strut functioning as a rigid member to transient aileron movement when unrestrained by the limit means to position said spoiler in proportion to the aileron position through a predetermined zone of aileron movement, said strut being elastic to absorb aileron when the strut is restrained by the limit means and the aileron movement is outside the predetermined zone.

4. In an aircraft wing having an aileron, a hydraulic mechanism for actuating said aileron proportional to pilot input, and a spoiler; operating mechanism for said spoiler comprising a hydraulic motor having a cylinder and a piston, opposite ends of the cylinder and piston respectively being pivoted to a pair of spaced bell cranks, a valve for controlling the expansion and contraction of the motor to raise and lower the spoiler, linkage connecting the bell crank to the spoiler, and means connecting the valve to the aileron actuating mechanism, said connecting means including an elastic strut, a push rod and a walking beam pivoted between said elastic strut and the control rod, a pair of stops for limiting the pivotal movement of the walking beam, said elastic strut being a rigid member to transmit aileron movement to control the operation of the spoiler through a predetermined zone of aileron movement when said walking beam is fully movable between said limit stops, said strut being elastic to absorb aileron movement when the strut is restrained by one of said stops and the aileron movement is outside the predetermined zone.

5. The spoiler operating mechanism of claim 4 wherein the spaced bell cranks are rotatably supported along an axis longitudinally the wing.

6. In an aircraft wing having an aileron, a hydraulic mechanism for actuating said aileron proportional to pilot input, and a spoiler; operating mechanism for said spoiler comprising a hydraulic motor having a cylinder and a piston, opposite ends of the cylinder and piston, respectively, being pivoted to a pair of spaced bell cranks, linkage connecting the bell cranks to the spoiler, said bell cranks being pivotally anchored to a bar, means for rotatably supporting the bar longitudinally the wing, a valve mounted integral with the cylinder for controlling the expansion and contraction of the motor to raise and lower the spoiler, and means connecting the valve to the aileron actuating mechanism, said connecting means including an elastic strut, a push rod, and a walking beam pivoted to and between said elastic strut and the control rod, a pair of spaced adjustable stops for limiting the pivotal movement of the walking beam, an idler link pivoted at one end to the cylinder and at another end to said push rod, said idler link intermediately connected to said valve whereby the displacement of the link from neutral by movement of the push rod will be counteracted by movement of the cylinder in the same direction to restore the idler link to a neutral position to complete a follow-up action, said elastic strut being a rigid member to transmit aileron movement to control the operation of the spoiler through a predetermined zone of aileron movement when said walking beam is fully movable between said limit stops, said strut being elastic to absorb aileron movement when the strut is restrained by one of said stops and the aileron movement is outside the predetermined zone.

References Cited in the file of this patent

UNITED STATES PATENTS

| | | |
|---|---|---|
| 2,452,599 | Paulus et al. | Nov. 2, 1948 |
| 2,472,653 | Eaton | June 7, 1949 |
| 2,494,208 | Schultz | Jan. 10, 1950 |
| 2,750,132 | Palmer et al. | June 12, 1956 |